Patented June 16, 1936

2,044,612

UNITED STATES PATENT OFFICE 2,044,612

PLASTICIZER

Alphons O. Jaeger, Mount Lebanon, Pa., assignor, by mesne assignments, to American Cyanamid & Chemical Corporation, a corporation of Delaware No Drawing. Application July 30, 1931, Serial No. 554,160

17 Claims. (Cl. 106—22)

This invention relates to plasticizers or softeners, and to compositions containing them.

Plastic compositions, such as cellulose ester or ether plastics; phenol aldehyde; aldehyde-amine; urea resins; and many other synthetic resins such as condensation products of polyhydric alcohols and polybasic acids, etc., frequently require a plasticizer or softener to render them less brittle and more easily workable. Plasticizers or softeners are also used in lacquers, imparting the desired flexibility or slow-drying qualities to the films formed therefrom. Many substances have been proposed as plasticizers, one of the principal classes being esters, the high boiling esters of mono- and polycarboxylic acids such as, for example, benzoates, phthalates, maleates, etc.

According to the present invention esters of reduced keto acids, such as diaryl methane acids, aryl alkyl methane acids and the like are used as plasticizers or softeners. These esters have the formula

RCH$_2$R'COOR$_2$ in which R is an aryl radical, R' is an aryl or alkyl radical and R$_2$ is any alcohol radical, either alkyl, aryl or aralkyl, etc. A softener or plasticizer depends for its effectiveness not only on its physical characteristics, i. e. melting point, boiling point, hardness, etc., but also on its solvent power for the resins or other plastics with which it is associated. The solvent action is also important in lacquers where the plasticizer must be dissolved in the solvent used. Many of the plasticizers proposed in the past, for example esters of simple acids such as phthalates, have a solubility for certain plastic compounds or, in some compositions, for certain components only. This decreases to some extent their usefulness and requires in many cases a considerably larger amount of plasticizer or does not permit incorporating sufficient plasticizer in the case of some lacquers. The characteristics of the plasticized composition are also imperfect in some cases where components are present for which the plasticizer does not have sufficient affinity.

The esters of the present invention possess remarkable solvent properties for a large number of plastics, as they contain not only the ester group but also the reduced ketone group. They are of high boiling point and great stability and of high resistance to heat, which is of importance when they are used with plastics of the heat hardening type.

While plasticizers of the present invention are applicable to all plastic compositions and corresponding lacquers, they are particularly effective with cellulose ester or ether plastics, phenol formaldehyde and phenol furfural resins, polyhydric alcohol-polybasic acid resins, condensation products of urea and formaldehyde, polymerized cumaron and indene resins, casein plastics, polymerized resins from styrol, itaconic acid, etc. and sulfur resins. Compositions containing natural resins such as shellac, copal, dammar, and the like may be effectively plasticized by means of the present invention which is in no sense to be considered limited to plastic compositions of the lacquers prepared by synthetic plastics.

The esters of the present invention are also applicable to new modified polyhydric alcohol organic acid resins containing both polycarboxylic and monocarboxylic acid, for example, resins of the glycerin, phthalic anhydride and glycerin phthalic anhydride natural resin type, etc. These compound resins have found an important field of usefulness in plastic compositions and lacquers, because of the fact that they are tough as well as being hard and can be incorporated with cellulose ester plastics in any amount, being for the most part completely compatible therewith which permits their use in cellulose ester lacquers as important modifying agents. The esters of the present invention show excellent compatibility with these modified or polyhydric alcohol organic acid resins and can be used in compositions containing them.

The commercially most important acids from which esters of the present invention are made may be prepared by two main methods, first, the reduction of keto acids obtained by the Friedel-Crafts reaction from dibasic acids or their anhydrides, and, second, in particular the case of acids which cannot be made by the reduction of keto acids from phthalic anhydride by the direct combination of phthalide with suitable cyclic hydrocarbons or other compounds in the place of phthalic anhydride. Phthalide condenses very easily under conditions of the Friedel-Crafts synthesis and produces the reduced keto acids directly. Representative esters are methyl, ethyl, propyl, butyl, amyl, cyclohexyl, tetrahydrofurfuryl and benzylbenzoates, naphthyl benzoates, hydrogenated naphthyl benzoates, benzyl acrylates, benzyl propionates, etc. Other acids can be obtained by the reduction of toluyl benzoic acids, acenaphthoyl benzoic acid, fluorenoyl benzoic acids and the like. It should be understood that the acids may be produced by any other known method, the present invention being in no sense limited to any particular method of production of the acids and some acids which may be used in the form of esters under the present invention cannot readily be prepared by Friedel-Crafts synthesis, such acids, of course, are also included. The simplest and cheapest method of producing acids containing the benzoic acid nucleus is to prepare them directly by the Friedel-Crafts synthesis, using phthalide instead of phthalic anhydride. It is thus possible to produce the acids directly without subsequent reduction, and as phthalide normally reacts more readily in the Friedel-Crafts synthesis than does phthalic anhydride, the process is an economical one and is the best method of preparing many of the common acids used in forming esters of the present invention. While pure esters may be used and are necessary in some cases where products of very light color are required, it is also possible in some cases to use esters obtained from crude acids. Thus, for example, when a keto aromatic acid is reduced, the reduced mixture may be directly esterified without isolation and complete purification of the reduced acid. Similarly, acids obtained from phthalide may be esterified in a crude form without complete isolation or purification, and such impure esters or ester mixtures are included in the present invention wherever their physical characteristics meet the requirements of the particular mixture in which they are to be used as a plasticizer.

The esters which have greatest commercial importance for most plastic compositions are those of the lower paraffin alcohols up to amyl alcohol, including mixed esters such as the mixed amyl esters prepared by esterifying the keto acid with an isomeric amyl alcohol obtained from natural gas and known in the trade as "Pentasol". The invention is in no sense limited to esters of these alcohols and includes esters of higher aliphatic alcohols, esters of aralkyl alcohols, heterocyclic and alicyclic alcohols and the like. Of course the ester should be one which is not itself a resin, and this excludes many of the esters of polyhydric alcohols such as glycerin, which esters are for the most part resins capable of being hardened by heat and which will, therefore, ordinarily not act as plasticizers.

The esters of the present invention, some of which are new chemical compounds, are for the most part low melting solids or viscous liquids, many being colorless and others having a faint yellow color. They possess extremely favorable physical characteristics, being of high boiling compounds, many of them not boiling at all at atmospheric pressure without decomposition. Their plasticizing effect is very high and they have excellent miscibility with the components of plastic compositions and lacquers in which they are used.

The invention will be described in more detail in connection with the following specific examples, which are representative illustrations and the invention is in no sense limited to the specific details therein set forth.

Example 1

85 parts of a glycerol phthalate resin, freshly prepared and fairly hard but not infusible, are mixed with 15 parts of methyl or ethyl benzylbenzoate. The mixture is heated to 150° C. with vigorous stirring until a homogeneous mixture is obtained. If desired, fillers may be incorporated and the product can then be molded under pressure at the usual temperature to form an infusible product, which is a well plasticized, easily machinable material.

Example 2

Phenol and formaldehyde are condensed in the usual manner to a product which is capable of being hardened by heat. Preferably, the condensation is carried out in the absence of fixed alkalies, and, after removal of water, 15% of butyl naphthylmethylbenzoate is incorporated with heating. If desired, instead of pure butyl naphthylmethylbenzoate, the product of esterification of crude naphthylmethylbenzoic acid can be used. This crude product may be obtained by the reduction of naphthoylbenzoic acid. The plasticized condensation product may be mixed with suitable fillers, with or without coloring matter, and molded under heat and pressure, forming a well plasticized, easily machinable material.

Example 3

A fluid condensation product of phenol and formaldehyde is prepared with or without a solvent and 20–25% of mixed amyl, benzyl or tolylbenzoates are added. This mixed ester may be obtained by esterifying the acid with the mixture of isomeric amyl alcohol sold in the trade under the name of "Pentasol". An enamel or lacquer is formed which spreads well when hot on a clean metal surface and can be baked to form a hard coating. A very flexible film is obtained which has excellent covering powers. If desired the amyl, tolyl and benzylbenzoates may be partly replaced with diethyl phthalate or with a mixture of equal parts of diethyl phthalate and butyl or amyl benzylbenzoate. Preferably, at least 1/3 to 1/2 of the plasticizers should be the benzyl or tolylbenzoate.

Example 4

A fusible phenol-furfural condensation product is prepared, and after removing any water and free alkali which may be present, about 12% of methyl benzylpropionate or a mixture of methyl benzylpropionate and methyl tetrahydronaphthylmethylbenzoate is incorporated to form a homogeneous mixture, if necessary with sufficient heat to render the whole mass fluid. The plasticizer is light-yellow in color and, therefore, the final product is somewhat colored. If desired, fillers may be added and the final product can be molded in the usual manner.

Example 5

A formaldehyde-urea or mixed urea thiourea resin is prepared and while still fusible 3–12% of ethyl benzylbenzoate or a mixture of 3 parts ethyl benzylbenzoate and 1 part phthalimide or N-ethanol phthalimide is added. The resin can then be hardened in the usual manner, if necessary with the addition of fillers.

Example 6

A fusible resin prepared by the polymerization or condensation of styrol is homogeneously admixed with 5–10% of butyl tolylbenzoate and 2–5% of dibutyl phthalate and is then hardened in the usual manner, resulting in a well plasticized product.

Example 7

A resin prepared by the condensation or polymerization of itaconic acid is mixed with about 5–10% of ethyl or butyl acenaphthylbenzoate, sufficient heat being used to produce a homogeneous mixture. The plasticized resin may be used in the ordinary manner.

Example 8

A nitrocellulose plastic is mixed with 5–35% of butyl benzylbenzoate or of "Pentasol" benzylbenzoate, the product being heated and kneaded to achieve a thorough incorporation. The product can then be molded and is capable of taking on a high polish.

Example 9

A cellulose nitrate lacquer is prepared with low boiling solvents to which 10–20% of butyl or amyl, benzyl or tolylbenzoate is added. If desired, in addition 5–10% of butyl benzylbenzoate or of phthalide may be added, forming a lacquer which spreads and brushes easily and produces a tough flexible film.

Example 10

A cellulose acetate lacquer is prepared with the usual low boiling solvents and 15% of methyl benzylbenzoate is added, a good brushing lacquer being obtained which gives smooth flexible films.

Example 11

A lacquer is prepared in low boiling solvents from 1 part of cellulose nitrate and 1–2 parts of a synthetic resin prepared by condensing glycerol phthalic anhydride and abietic acid in equal molecular proportions. To this lacquer is added 20% of butyl or amyl benzyl or xylylbenzoate, a lacquer being obtained which is free from blushing and which produces a film having remarkable resistance to weather.

Example 12

A lacquer is prepared from equal parts of cellulose nitrate and a resin produced by the reaction of glycerine phthalic anhydride and phthalide in equal molecular proportions to which is added 15% of "Pentasol" benzylbenzoate and 5–10% phthalide or hexahydrophthalide. The lacquer brushes well and leaves a film which shows remarkable toughness and resistance to weather.

Example 13

A molding composition containing shellac or other natural resins is incorporated with about 20–25% of methyl benzylbenzoate or an equal mixture of methyl benzylbenzoate and dibutyl phthalate. The incorporation is effected by heating and stirring or kneading. The composition can be readily molded and worked and is capable of taking a very fine finish.

Example 14

A polymerized cumaron and indene resin is prepared and mixed with about 10% of methyl benzylbenzoate or equal parts of methyl benzylbenzoate and dibutyl phthalate. A well plasticized resin being obtained.

Example 15

A polymerized vinyl resin is prepared in the ordinary manner and dissolved in a suitable solvent to form a lacquer, to which is added 10–20% of ethyl or propyl benzylbenzoate. The lacquer, on application, leaves a film of very desirable characteristics.

The present invention is in part a continuation of my prior application Serial No. 395,966, filed September 28, 1929, now Patent 1,978,710.

What is claimed as new is:

1. A plasticized composition comprising an organic plastic and an ester of an acid having the formula $$RCH_2R'COOH$$ 

in which R and R' are both cyclic radicals with a monohydric alcohol.

2. A plasticized composition comprising an organic synthetic plastic and an ester of an acid having the formula $$RCH_2R'COOH$$

in which R and R' are both cyclic radicals with a monohydric alcohol.

3. A plasticized film containing at least one plasticizable organic film forming substance and an ester of an acid having the formula $$RCH_2R'COOH$$ 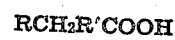

in which R and R' are both cyclic radicals with a monohydric alcohol.

4. A plasticized composition comprising a plasticizable organic substance and an ester of an acid having the formula $$RCH_2R'COOH$$ 

in which R and R' are both cyclic radicals with a monohydric alcohol.

5. A plasticized coating composition comprising a plasticizable organic substance and an ester of an acid having the formula $$RCH_2R'COOH$$ 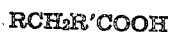

in which R and R' are both cyclic radicals with a monohydric alcohol.

6. A plasticized composition comprising a plasticizable organic substance and an ester of an acid having the formula

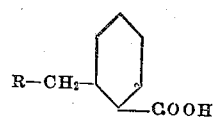

in which R is any cyclic radical with a monohydric alcohol.

7. A plasticized composition comprising a plasticizable organic substance and an ester of an acid having the formula

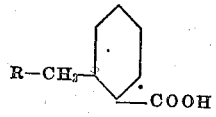

in which R is a mononuclear aromatic radical with a monhydric alcohol.

8. A composition according to claim 1, in which the plasticizable substance is a phenolaldehyde resin capable of being hardened by heat.

9. A composition according to claim 4, in which the plasticizable substance is a phenolaldehyde resin capable of being hardened by heat.

10. A composition according to claim 1, in which the organic plasticizable substance is a cellulose ester.

11. A composition according to claim 4, in which the organic plasticizable substance is a cellulose ester.

12. A composition according to claim 5, in which the organic plasticizable substance includes both an ester of cellulose and a resin of a polyhydric alcohol organic acid type compatible therewith.

13. A composition according to claim 5, in which the organic plasticizable substance is a mixture of an ester of cellulose and a resin of the polyhydric alcohol-polybasic acid-monocarboxylic acid type.

14. A composition according to claim 5, in which the organic plasticizable substance includes both a nitro-cellulose and a resin of polyhydric alcohol organic acid type compatible therewith.

15. A composition according to claim 5, in which the organic plasticizable substance is a mixture of a nitrocellulose and a resin of the polyhydric alcohol-polybasic acid-monocarboxylic acid type.

16. A composition according to claim 1, in which the organic plasticizable substance is a urea resin.

17. A composition according to claim 4, in which the organic plasticizable substance is a urea resin.

ALPHONS O. JAEGER.